United States Patent
Seo

(10) Patent No.: US 7,556,533 B2
(45) Date of Patent: Jul. 7, 2009

(54) RECHARGEABLE BATTERY MODULE CAPABLE OF MANAGING THE VARIATION OF INTERVALS BETWEEN UNIT BATTERIES

(75) Inventor: Se-Wook Seo, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 302 days.

(21) Appl. No.: 11/218,547

(22) Filed: Sep. 6, 2005

(65) Prior Publication Data

US 2006/0091855 A1    May 4, 2006

(30) Foreign Application Priority Data

Oct. 28, 2004    (KR) ..................... 10-2004-0086608

(51) Int. Cl.
*H01R 24/00*    (2006.01)
*H01R 33/00*    (2006.01)
*H01M 2/26*    (2006.01)
*H01M 2/24*    (2006.01)
*H02J 7/00*    (2006.01)

(52) U.S. Cl. .................. 439/627; 429/121; 429/158; 320/116; 320/120

(58) Field of Classification Search ................ 429/158, 429/160; 439/177, 202, 504, 510, 626–627, 439/630, 754–775, 778–779, 787, 790, 840; 320/104, 116, 120, 122, 130, 137, 147; 180/54.1, 180/68.5; 29/730–731; D13/120, 154, 119
See application file for complete search history.

(56) References Cited

U.S. PATENT DOCUMENTS

| | | | | |
|---|---|---|---|---|
| 481,664 | A * | 8/1892 | Engledue ................... 429/149 |
| 2,901,526 | A * | 8/1959 | Huntley et al. .............. 429/121 |
| 3,436,719 | A * | 4/1969 | Scheinbaum ................ 439/510 |
| D399,486 | S * | 10/1998 | Deans ......................... D13/120 |
| 5,985,480 | A * | 11/1999 | Sato et al. ..................... 429/65 |
| 6,270,378 | B1 * | 8/2001 | Lee ............................ 439/627 |
| D450,653 | S * | 11/2001 | Hertel et al. ............... D13/119 |

FOREIGN PATENT DOCUMENTS

| | | | |
|---|---|---|---|
| CN | 1300107 | | 6/2001 |
| EP | 1338233 A | * | 11/1973 |
| JP | 38-024040 | | 11/1963 |

(Continued)

OTHER PUBLICATIONS

Machine Translation and Abstract in English of JP 11111260.*

*Primary Examiner*—Alexa D. Neckel
*Assistant Examiner*—Claire L Rademaker
(74) *Attorney, Agent, or Firm*—H.C. Park & Associates, PLC

(57) ABSTRACT

A rechargeable battery module includes a plurality of unit batteries, a connecting member, and a fixing member. The unit batteries are arranged in a housing and include a positive terminal and a negative terminal. The connecting member couples a terminal of a unit battery to a terminal of an adjacent unit battery. At least one portion of the connecting member into which the terminals are inserted is formed in a different shape from the shape of the terminal. The fixing member couples the connecting member to the positive terminal and the negative terminal.

9 Claims, 5 Drawing Sheets

FOREIGN PATENT DOCUMENTS

| | | |
|---|---|---|
| JP | 50-139219 | 11/1975 |
| JP | 57-015078 | 1/1982 |
| JP | 63-004062 | 1/1988 |
| JP | 09-129202 | 5/1997 |
| JP | 10-106539 | 4/1998 |
| JP | 11067184 | 3/1999 |
| JP | 11-111260 | 4/1999 |
| JP | 11111260 A * | 4/1999 |
| JP | 2000-040500 | 2/2000 |
| JP | 2001-250524 | 9/2001 |
| JP | 2002198028 | 7/2002 |
| JP | 2003-007255 | 1/2003 |
| JP | 2004-031049 | 1/2004 |
| JP | 2004-213922 | 7/2004 |
| KR | 1019970031067 | 6/1997 |
| KR | 2019980045561 | 9/1998 |
| KR | 1020010057626 | 7/2001 |

\* cited by examiner

RECHARGEABLE BATTERY MODULE CAPABLE OF MANAGING THE VARIATION OF INTERVALS BETWEEN UNIT BATTERIES

CROSS REFERENCE TO RELATED APPLICATION

This application claims priority to and the benefit of Korean Patent Application No. 10-2004-0086608, filed on Oct. 28, 2004, which is hereby incorporated by reference for all purposes as if fully set forth herein.

BACKGROUND OF THE INVENTION

1. Field of the Invention

The present invention relates to a rechargeable battery module, and more particularly, to a battery module that is capable of effectively managing the variation of intervals between unit batteries.

2. Discussion of the Background

Generally, rechargeable batteries can be charged and discharged repeatedly so that they can be used many times. In particular, rechargeable batteries that have only one battery is cell are mainly used for various small portable electronic devices such as cellular phones, laptop computers, cameras, and camcorders. High-capacity rechargeable batteries, hereinafter referred to as "battery modules" are formed by connecting a plurality of battery cells, hereinafter referred to as "unit batteries." Battery modules are mainly used as power sources for motors of hybrid electric vehicles (HEV), electrical vehicles (EV), etc.

Each of the unit batteries that constitute a battery module include an electrode assembly comprising a positive plate, a negative plate, and a separator that is interposed therebetween. The unit batteries further include a case to house the electrode assembly, a cap assembly for closing the case, and a positive terminal and a negative terminal that protrude from the cap assembly and are coupled with the positive plate and the negative plate, respectively.

Further, when the unit batteries have a rectangular box shape, a positive terminal and a negative terminal protrude upward from the cap assembly. They are arranged to alternate with a positive terminal and a negative terminal of an adjacent unit battery. The positive terminals and the negative terminals are threaded and a connecting terminal is connected between the threaded positive terminals and negative terminals with nuts, thereby forming a battery module.

Since the battery module is constructed by connecting multiple unit batteries together, the intervals between the unit batteries may not be uniform. When partition walls are formed between the unit batteries, the variation in space between the respective unit batteries further increases due to installation errors and variations in the partition walls.

Therefore, in order to manage the variation in intervals between the unit batteries, a conventional battery module may include a bent portion that is formed in the middle portion of a connecting terminal for connecting positive terminals and negative terminals that are adjacent to each other.

However, a bent portion also requires sufficient space to install the connecting terminal. Also, the bent portion may be deformed, causing the connecting terminal to be damaged or broken during its installation. In addition, if the bent portion is pressed by an external force, unexpected short-circuiting may occur.

SUMMARY OF THE INVENTION

The present invention provides a battery module that is capable of effectively managing the variations in intervals between unit batteries that is caused by assembling errors or manufacturing variations by constructing a connecting member with an elongated hole or an elongated groove. This structure does not require a bent portion, as do conventional battery modules.

Additional features of the invention will be set forth in the description which follows, and in part will be apparent from the description, or may be learned by practice of the invention.

The present invention discloses a battery module comprising a plurality of unit batteries that are stacked in a housing. Each unit battery includes a positive terminal, a negative terminal, and a connecting member for coupling a terminal of one unit battery to a terminal of an adjacent unit battery. At least one portion of the connecting member into which the terminals are inserted is formed in a shape that is different from the shape of the terminal. Each unit battery also includes a fixing member for fixing the connecting member to the positive terminal and the negative terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DESCRIPTION OF THE ILLUSTRATED EMBODIMENTS

The battery module of the present invention may be used as a power source for driving a motor in apparatuses such as hybrid electric vehicles (HEV), electric vehicles (EV), cordless appliances, and electric scooters. Moreover, the battery module may be used in various applications which require high power output.

In the battery module of the present invention, portions of the connecting member into which a positive terminal and a negative terminal are inserted are formed as an elongated hole or an elongated groove. This hole or groove makes it is possible to effectively manage variations in manufacture and assembling errors that may exist in the battery module or its partition walls.

In addition, since it is possible to smoothly assemble a battery without deforming the connecting member even if a defect exists in the unit battery or its partition walls, the performance of the battery module may improve and the product failure caused by breakage of the connecting member may be decreased.

Further, even if the battery module is used in apparatuses that are moved frequently or rocked severely, it is possible to effectively maintain the unit batteries in place using the connecting member. Thus, the reliability and the durability of the battery module can be improved.

Figure 1:
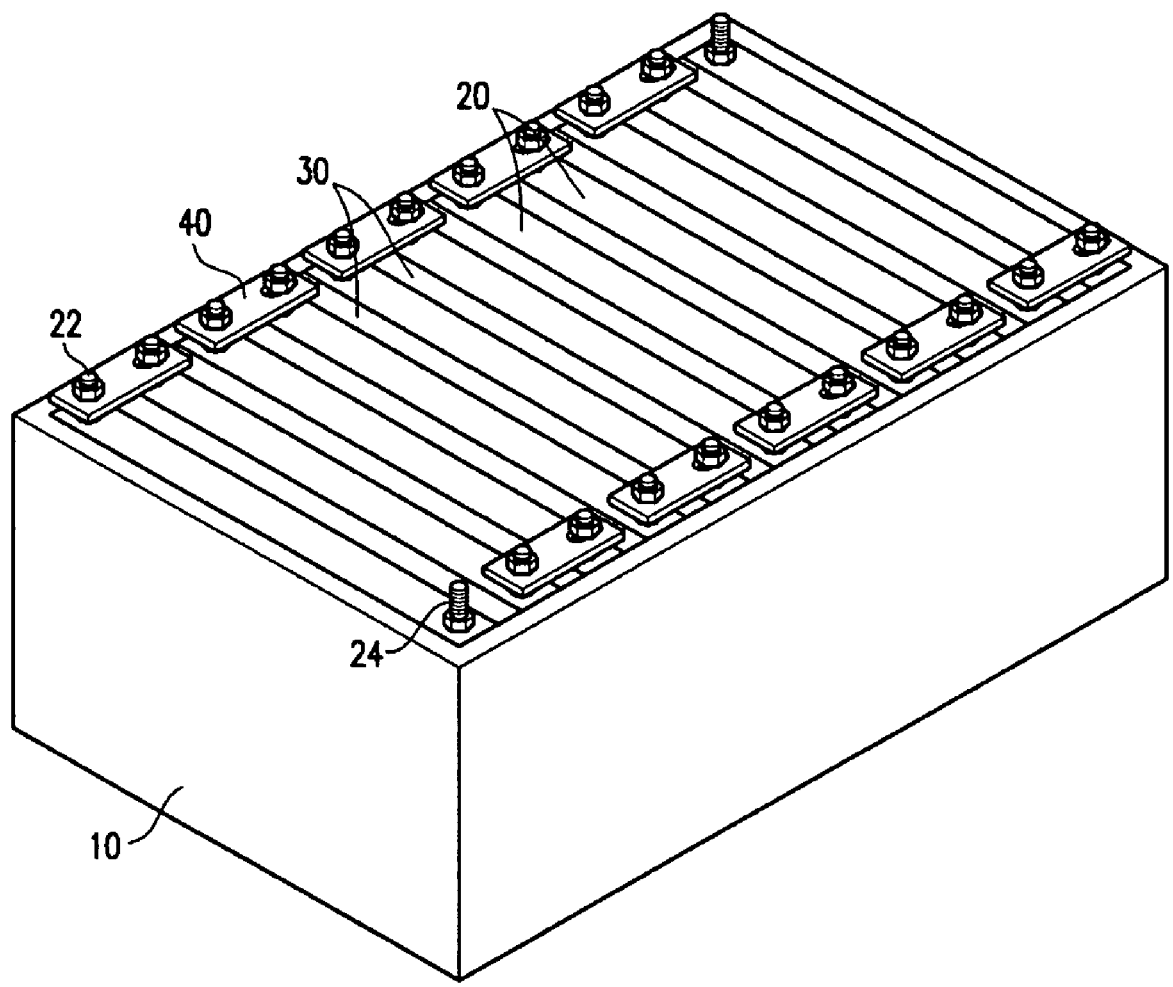
FIG. 1 is a perspective view of a battery module according to an exemplary embodiment of the present invention.
Figure 2:
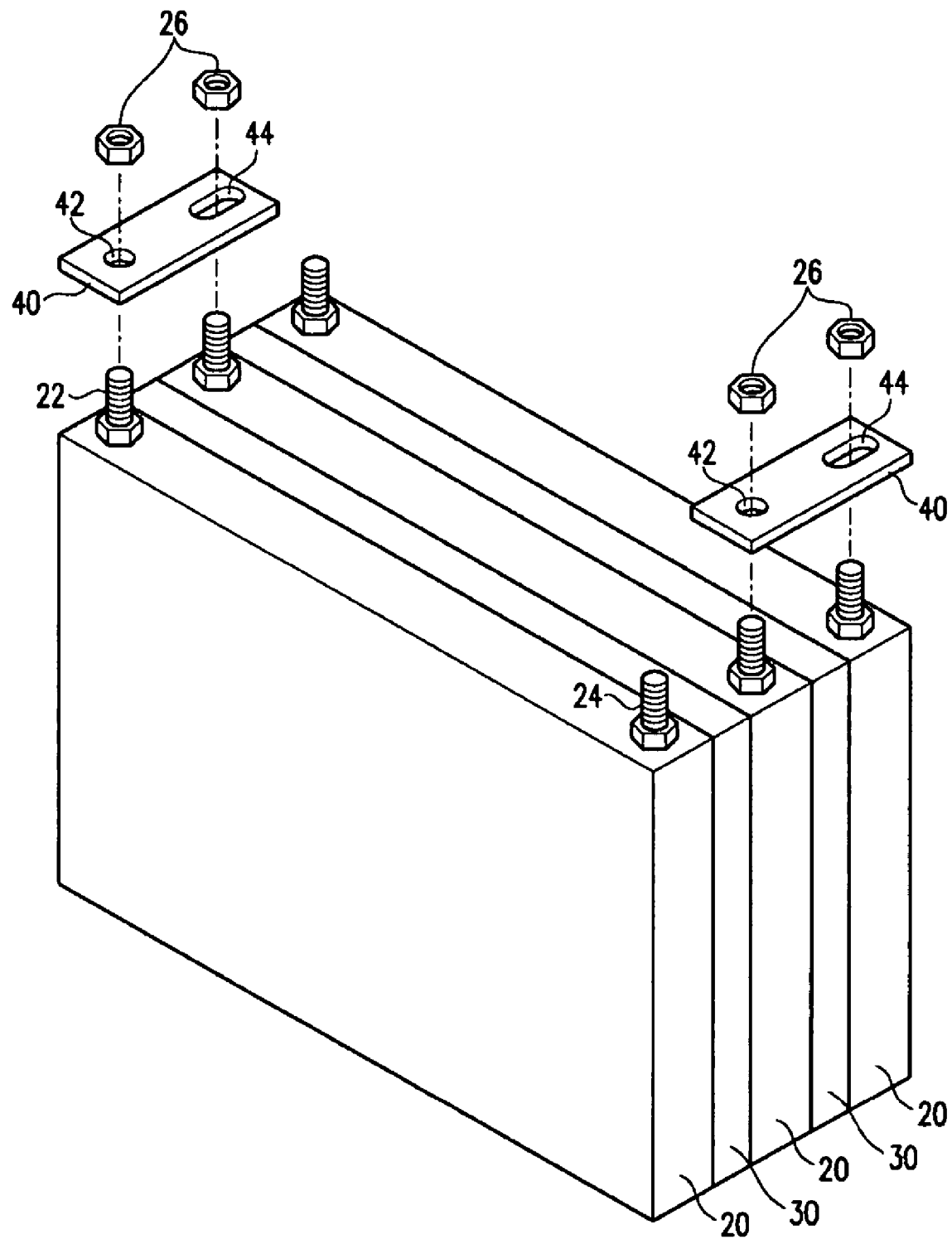
FIG. 2 is an exploded perspective view of the assembly of unit batteries and connecting members in the battery module according to the exemplary embodiment of the present invention.

As shown in FIG. 1 and FIG. 2, a battery module according to an embodiment of the present invention comprises a plurality of unit batteries 20 that are arranged in a housing 10. Each unit battery includes a positive terminal 22 and a negative terminal 24 that protrude therefrom, and connecting members 40 that couple the positive terminals 22 and the negative terminals 24 of the stacked unit batteries 20 that are positioned adjacent to each other. Each connecting member has a portion into which at least one positive terminal 22 or a negative terminal 24 is inserted which has a shape different from the shape of the terminals 22 and 24. The connecting members 40 also include fixing members 26 that couple the connecting members 40 to the positive terminals 22 and the negative terminals 24.

As shown in FIG. 1, the unit batteries 20 are stacked in a box-shaped housing 10. Also, spaces are defined between the stacked unit batteries 20 to allow cooling air to pass through the unit batteries 20. Partition walls 30 may be provided to maintain regular intervals between the unit batteries 20 and to prevent short circuits between the unit batteries 20.

Male threads are formed in the positive terminals 22 and the negative terminals 24, and female threads are formed in the fixing members 26 so that the connecting members 40 are fixed by tightening the fixing members 26 to the positive terminals 22 and negative terminals 24. For example, nuts and the like may be used as fixing members 26.

The unit batteries 20 may be connected in series or in parallel, or may be arranged by a combination of series and parallel connections. For example, when two unit batteries 20 are positioned adjacent to each other, a positive terminal 22 of one unit battery 20 may be connected to a positive terminal 22 of another unit battery 20 using the connecting member 40 or a positive terminal 22 of one unit battery 20 may be connected to a negative terminal 24 of another unit battery 20 by the connecting member 40.

As shown in FIG. 2, each of the connecting members 40 is formed with a pair of holes 42 and 44 with a predetermined distance between them that corresponds to the distance between two adjacent unit batteries 20 that are to be coupled with each other. Positive terminals 22 and negative terminals 24 on both sides of the two adjacent battery units 20 are respectively inserted into the pair of holes 42 and 44.

One hole 44 is elongated in the longitudinal direction of the connecting members 40 of the unit batteries 20, and the other hole 42 has a shape that corresponds to the shape and size of the positive terminal 22 or the negative terminal 24. The elongated hole is elongated at least in one direction and includes various shapes such as elliptical, a track shape, and a rectangular shape, as opposed to a circular shape or a square shape.

When the elongated hole 44 is formed in the connecting member 40, the battery pack may be assembled easily even if there is variation in the distance between the positive terminals 22 or the negative terminals 24 of the adjacent unit batteries 20 due to variations in manufacturing or an assembling error of the unit batteries 20 or the partition walls 30.

Although the above embodiment has been described in conjunction with a structure in which two terminals 22 or 24 are connected to each other by a connecting member 40, the present invention is not limited thereto. For example, at least three holes may be formed in a connecting member 40 so that a plurality of unit batteries 20 may be coupled with each other. In this case, it is preferable that at least two of the three holes formed in the connecting member 40 are formed as elongated holes to effectively handle the variation in distance between the positive terminals 22 or the negative terminals 24 of adjacent unit batteries 20.

The connecting member 40 may comprise a conductive material so as to couple the positive terminals 22 or the negative terminals 24 with each other. Further, it is preferable that the connecting member 40 have an appropriate size and thickness. Thus, a metallic material having predetermined rigidity may be used to maintain the connecting member in place such as when the battery module is applied to apparatuses such as electric vehicles which move and may be rocked severely.

Even if the connecting member 40 is made of a rigid material that is difficult to deform, since the hole 44 is elongated it is possible to effectively manage an assembling error and a variation in manufacturing without deforming the connecting member 40.

Figure 3:
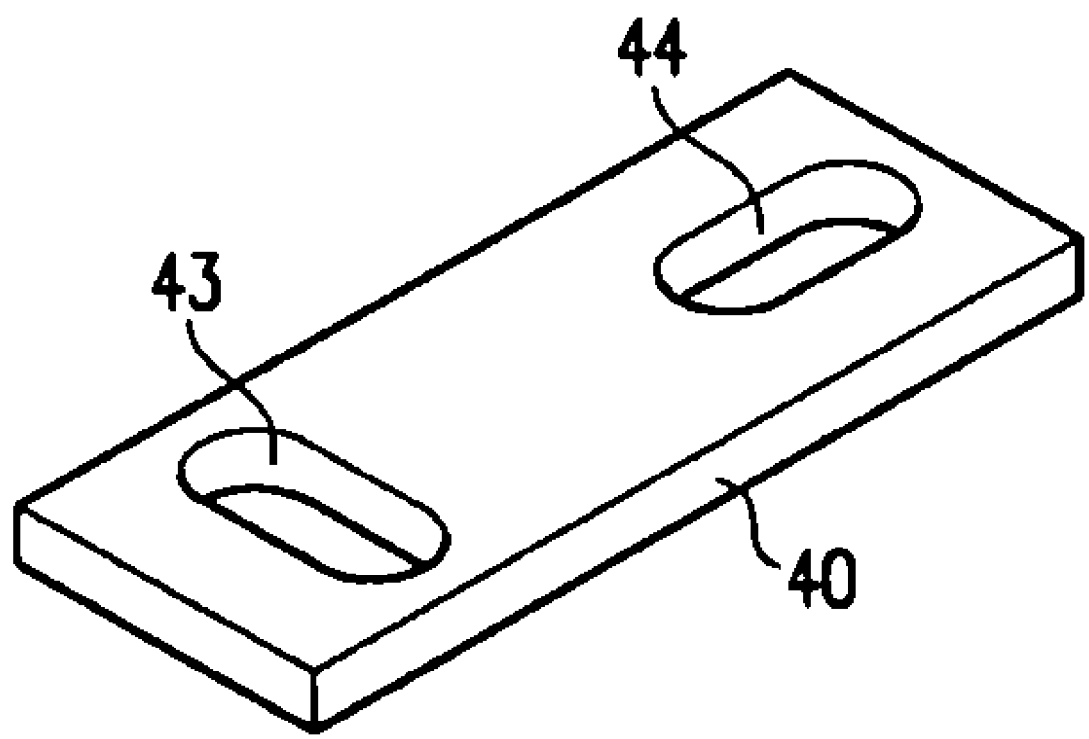
FIG. 3 is a perspective view of a first modification of the connecting members in the battery module according to the exemplary embodiment of the present embodiment.

According to a first modification of the connecting member 40 as shown in FIG. 3, a hole 43 is elongated in a direction perpendicular to the arrangement direction of the unit batteries 20 (the widthwise direction of the connecting member 40), and another hole 44 is elongated in the arrangement direction of the unit batteries 20 (in the longitudinal direction of the connecting member 40). That is, the holes 43 and 44 that are formed on both sides of the connecting member 40 are elongated in different directions. Thus, assembling errors and variations in manufacturing that occur in various directions may easily be managed.

Figure 4A:
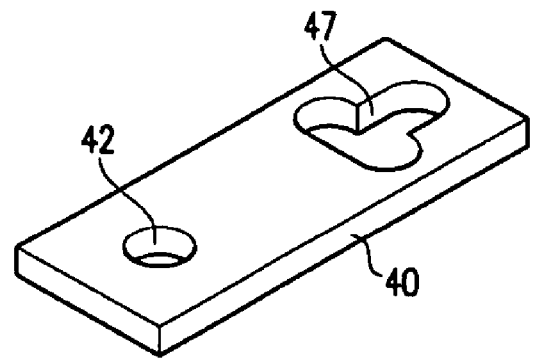
FIG. 4A, FIG. 4B, and FIG. 4C are perspective views of a second modification of the connecting members in the battery module according to the exemplary embodiment of the present invention.
Figure 4B:
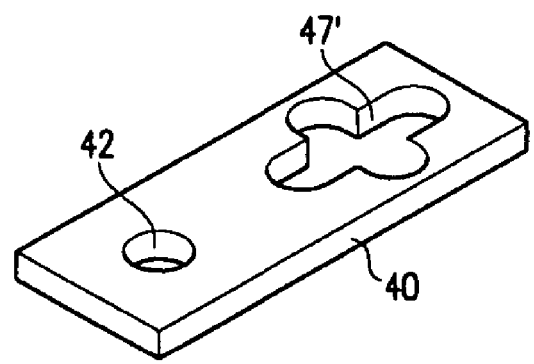
Figure 4C:
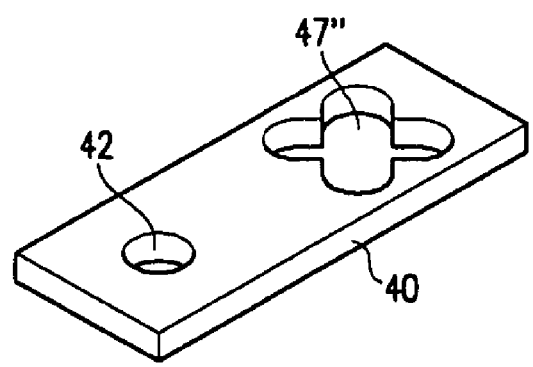

Further, according to a second modification of the connecting member 40 as shown in FIG. 4A, FIG. 4B, and FIG. 4C, a hole 42 is formed in a shape corresponding to the shape and size of the positive terminal 22 or the negative terminal 24, and the other hole 47, 47', or 47" may be formed in a shape such that a hole elongated in the arrangement direction of the unit batteries 20 and a hole elongated in the direction perpendicular to the arrangement direction of the unit batteries 20 are combined with each other.

That is, the other hole 47 is formed substantially in a T-shape such that two elongated holes are formed in different directions (see FIG. 4A).

In addition, the other hole 47' may be formed in a cross shape (see FIG. 4B), or the other hole 47" may be formed in an X-shape (see FIG. 4C). The other hole of the present invention may be formed in various shapes and is not limited to the shapes described above.

Figure 5:
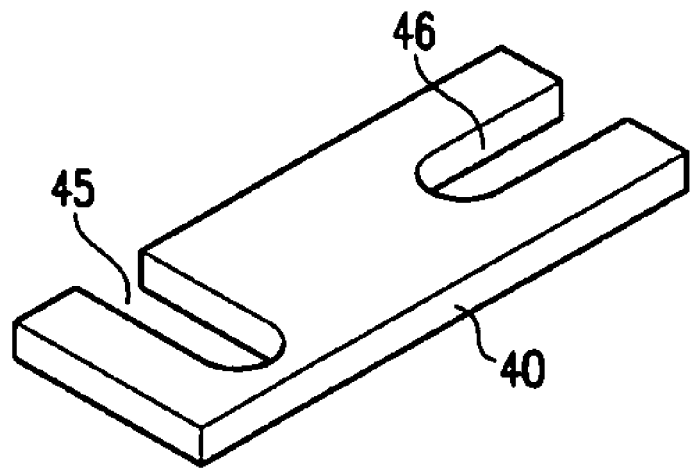
FIG. 5 is a perspective view of a third modification of the connecting members in the battery module according to the exemplary embodiment of the present invention.

Further, according to a third modification of the connecting member 40 as shown in FIG. 5, a portion of the connecting member 40 into which at least one positive terminal 22 or negative terminal 24 is inserted may be formed as an elongated groove (45 or 46). Here, an elongated groove is a groove that is elongated in at least one direction in various shapes such as an elliptical shape, a track shape, and a rectangular shape where one side is open.

A groove 45 may be elongated in the widthwise direction of the connecting member and have an open side, and the other groove 46 may be elongated in the longitudinal direction of the connecting member and have an open side. That is, the grooves 45 and 46 that are formed on both sides of the connecting member 40 may be elongated in different directions and have an open side.

Figure 6:
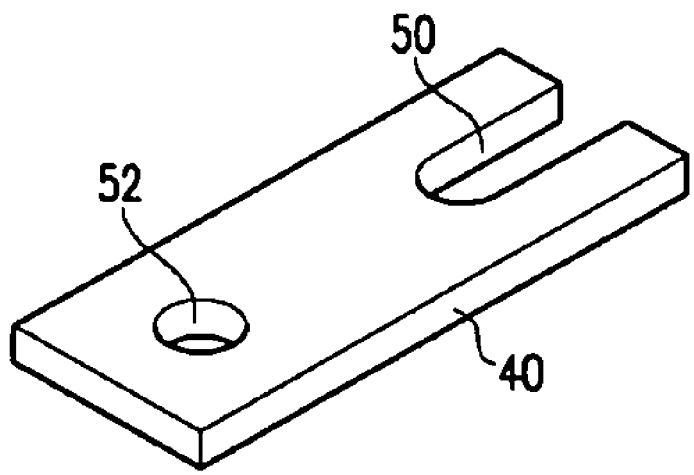
FIG. 6 is a perspective view showing a fourth modification of the connecting members in the battery module according to the exemplary embodiment of the present invention.

Although the above embodiment and modifications have described structures in which a portion of the connecting member 40 into which the positive terminal 22 or the negative terminal 24 inserted thereinto is formed as a hole or a groove, the present invention is not limited thereto. For example, as shown in FIG. 6, one portion of a connecting member 40 may be formed as a groove 50 while another portion thereof may be formed as a hole 52.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A battery module, comprising:
   a plurality of unit batteries that are arranged in a housing;
   a connecting member for coupling a terminal of a first unit battery to a terminal of a second unit battery by receiving the terminals therein; and
   a fixing member for coupling the connecting member to the terminal of the first unit battery and the terminal of the second unit battery,
   wherein the connecting member is a rectangular plate consisting of a first opening and a second opening, the first opening being an elongated opening in a first sidewall of the connecting member to receive the terminal of the first unit battery, the second opening being an elongated opening in a second sidewall of the connecting member to receive the terminal of the second unit battery, the first sidewall being perpendicular to the second sidewall.

2. The battery module of claim 1, further comprising:
   a plurality of partition walls for maintaining predetermined intervals between the unit batteries.

3. The battery module of claim 1,
   wherein the terminals are coupled with the connecting member through the first opening and the second opening.

4. The battery module of claim 3,
   wherein the first opening and the second opening are elongated in different directions.

5. An apparatus, comprising:
   a motor; and
   the battery module of claim 1,
   wherein the battery module drives the motor.

6. The battery module of claim 2, wherein a single partition wall is disposed between the first unit battery and the second unit battery.

7. The battery module of claim 1,
   wherein the second opening has a shape corresponding to the shape of the terminal it receives.

8. The battery module of claim 1, wherein the fixing member comprises thread nuts and the connecting member is sandwiched between the threaded nuts.

9. The battery module of claim 8, wherein the threaded nuts that sandwich the connecting member directly contact the connecting member.

* * * * *